(12) United States Patent
Charcosset

(10) Patent No.: US 11,812,686 B2
(45) Date of Patent: Nov. 14, 2023

(54) SPRAYING SYSTEM FOR AGRICULTURAL VEHICLE AND SPRAYING METHOD USING SUCH A SYSTEM

(71) Applicant: EXEL INDUSTRIES, Epernay (FR)

(72) Inventor: Philippe Charcosset, Paris (FR)

(73) Assignee: EXEL INDUSTRIES, Epernay (FR)

( * ) Notice: Subject to any disclaimer, the term of this patent is extended or adjusted under 35 U.S.C. 154(b) by 323 days.

(21) Appl. No.: 17/196,166

(22) Filed: Mar. 9, 2021

(65) Prior Publication Data
US 2021/0282315 A1   Sep. 16, 2021

(30) Foreign Application Priority Data

Mar. 11, 2020   (FR) ...................................... 2002412

(51) Int. Cl.
| | | |
|---|---|---|
| A01C 23/04 | (2006.01) | |
| A01C 23/00 | (2006.01) | |
| A01M 7/00 | (2006.01) | |
| B05B 9/04 | (2006.01) | |
| B05B 12/04 | (2006.01) | |

(52) U.S. Cl.
CPC .......... *A01C 23/047* (2013.01); *A01C 23/007* (2013.01); *A01M 7/0089* (2013.01); *B05B 9/0423* (2013.01); *B05B 12/04* (2013.01)

(58) Field of Classification Search
CPC .. A01C 23/047; A01C 23/007; A01M 7/0089; B05B 9/0423; B05B 12/04; B05B 1/3093
See application file for complete search history.

(56) References Cited

U.S. PATENT DOCUMENTS

| | | | | |
|---|---|---|---|---|
| 5,035,357 A * | 7/1991 | Brickell | ................. | B05B 12/00 137/489.5 |
| 2008/0197207 A1 * | 8/2008 | Engelbrecht | ........ | A01M 7/0089 239/1 |
| 2012/0241533 A1 * | 9/2012 | Moeller | ............. | A01M 7/0089 239/1 |
| 2017/0006852 A1 * | 1/2017 | Engelbrecht | ........ | A01M 7/0089 |

FOREIGN PATENT DOCUMENTS

| | | |
|---|---|---|
| EP | 1428433 A1 | 6/2004 |
| EP | 2796038 A2 | 10/2014 |
| FR | 2534451 A2 | 4/1984 |
| FR | 2555469 A1 | 5/1985 |

OTHER PUBLICATIONS

Preliminary French Search Report for French Patent Application No. 2002412 dated Dec. 4, 2020.

* cited by examiner

*Primary Examiner* — Tuongminh N Pham
(74) *Attorney, Agent, or Firm* — Pearne & Gordon LLP

(57) ABSTRACT

A spraying system for an agricultural vehicle including a spraying boom and a circuit including a tank, a pump, a pilot-operated pressure regulator and a plurality of spraying sections each including at least one spraying device including at least one spraying nozzle designed to spray treatment liquid on plants to be treated in the field, a first distributor and at least one direct acting pressure limiter, the circuit also including a second distributor and a spraying system a control unit designed to implement a step to prime the spraying system.

11 Claims, 5 Drawing Sheets

SPRAYING SYSTEM FOR AGRICULTURAL VEHICLE AND SPRAYING METHOD USING SUCH A SYSTEM

CROSS-REFERENCE TO RELATED APPLICATIONS

This application claims priority to French Patent Application No. 2002412 filed on Mar. 11, 2020, the entire content of which is incorporated by reference herein.

TECHNICAL DOMAIN

The invention relates to a spraying system for an agricultural vehicle designed to spray a treatment liquid in a field of plants to be treated, especially large-scale crops such as grain cultivation, and a spraying method making use of such a spraying system.

STATE OF PRIOR ART

FIG. 1 shows an agricultural spraying system 10 for large-scale crops known in prior art.

This agricultural spraying system 10 comprises a system that comprises a tank 11 filled with a treatment liquid and a pump 12 designed to draw in the treatment liquid contained in the tank 11 and to discharge it on one hand into the tank 11 through a pilot-operated pressure regulator 13, and on the other hand to a plurality of sections 14 of a spraying boom 15 extending transversely from a longitudinal direction along which the agricultural spraying system 10 advances, the sections 14 being mounted parallel to each other and distributed along the spraying boom 15.

The pressure regulator 13 is designed to regulate the pressure in the circuit downstream from the pump 12 and upstream from the pressure regulator 13, to a threshold pressure. The pressure regulator 13 can thus maintain the pressure in the circuit at the threshold pressure.

Each section 14 of the spraying boom 15 comprises a distributor 16 that communicates with the pump 12 on the upstream side and with a plurality of nozzles 17 on the downstream side, each through a direct-acting pressure limiter 18. When the distributor 16 of a section 14 is open, the pump 12 supplies the nozzles 17 with treatment liquid to be sprayed onto plants to be treated.

The pressure limiters 18 are designed to enable a circulation of treatment liquid to the nozzles 17, when a pressure in sections 14 of the spraying boom 15 is greater than or equal to a predetermined calibration pressure. The pressure limiters 18 thus make it possible to spray treatment liquid only when the pressure in sections 14 is greater than or equal to the calibration pressure.

The spraying system 10 operates as follows. When the pump 12 is started, the distributors 16 are closed, preventing the pump 12 from supplying treatment liquid to sections 14 of the spraying boom 15. The threshold pressure is further fixed at a value of the threshold pressure greater than or equal to the calibration pressure of the flow limiters. The pressure thus increases in the circuit downstream from the pump 12 and upstream from sections 14 of spraying boom 15.

When the pressure in the circuit downstream from the pump 12 and upstream from sections 14 of the spraying boom 15 reaches the first threshold pressure, the distributors 16 open to supply sections 14 and therefore nozzles 17 with treatment liquid. Furthermore, since the pressure in sections 14 of the spraying boom 15 is necessarily higher than the calibration pressure of the pressure limiters 18, the nozzles 17 are supplied with treatment liquid that they then spray on the plants to be treated.

However, when the distributors 16 are opened, the treatment liquid firstly primes all sections 14 of the spraying boom 15 that are filled with air or clean water after having been rinsed. However, since the distance between each section 14 of the spraying boom 15 and the pump 12 is different depending on the section 14, this priming begins with the sections 14 closest to the pump 12 and terminates with the sections 14 furthest from the pump 12. As a result, the area treated on the ground over the first meters travelled by the agricultural spraying system 10 is less than the area that should normally have been treated. For example, when the sections 14 that are primed first are the sections in the middle of the spraying boom 15 and the sections 14 that are primed last are the sections at the ends of the spraying boom 15, the result is that the shape of the area treated on the ground is trapezoidal rather than rectangular. Over these first meters, some of the plants that should have been treated have not been treated, and this is very difficult to correct.

In order to avoid this situation, it is common to prime sections 14 of the spraying boom 15 for a certain time at the edge of the field without advancing the agricultural spraying system 10, and to start moving forward in the field of plants to be treated only after all sections 15 have been primed.

However, this solution is not acceptable as it causes an excess concentration or overdose of the treatment liquid at the edge of the field, which is harmful to both the crops and the environment.

PRESENTATION OF THE INVENTION

The purpose of this invention is to compensate for the above mentioned disadvantages by disclosing an agricultural spraying system in which spraying sections provided with treatment liquid spraying nozzles can be primed, without spraying any treatment liquid.

More specifically, the invention relates to a spraying system for an agricultural vehicle comprising:
- a spraying boom extending along a principal extension direction;
- a circuit comprising:
  - a tank for containing a treatment liquid,
  - a pump comprising an inlet and an outlet, the pump being designed to draw in the treatment liquid contained in the tank through the inlet and to discharge the drawn in treatment liquid through the outlet,
  - a pilot-operated pressure regulator communicating with the outlet of the pump on the upstream side, and with the tank or the inlet of the pump on the downstream side, the pressure regulator being designed to regulate a pressure in the circuit downstream from the pump and upstream from the pressure regulator to a threshold pressure,
  - a plurality of spraying sections mounted on the spraying boom, each spraying section comprising:
    - at least one spraying device comprising at least one spraying nozzle designed to spray treatment liquid on plants to be treated in the field,
    - a first distributor communicating with the outlet of the pump on the upstream side, and with the spraying device(s) of the spraying section on the downstream side, the first distributor being designed to allow a circulation of treatment liquid discharged through the outlet of the pump to the spraying device(s) of the spraying section when in an open position, and to block said circulation of
treatment liquid when in a closed position,
a direct acting pressure limiter interposed between
the first distributor and the spraying nozzle(s) of
each spraying device of the spraying section, the
or each pressure limiter being designed to allow a
circulation of treatment liquid from the first dis-
tributor to the spraying nozzle(s) with which it
communicates when a pressure in the spraying
section upstream from the pressure limiter, is
greater than or equal to a predefined calibration
pressure Pt,
a second distributor communicating with each spraying
section on the upstream side, and with the tank or the
inlet of the pump on the downstream side, the second
distributor being designed to allow a circulation of
treatment liquid from each spraying section to the
tank or inlet of the pump when in an open position,
and to block said circulation of treatment liquid
when in a closed position,
a control unit designed to implement a priming step of the
spraying system comprising sub-steps to:
assign a first threshold pressure value to the threshold
pressure of the pressure regulator, the first threshold
pressure value being less than the predefined cali-
bration pressure of the pressure limiters,
switch the first distributor of each spraying section and
the second distributor into the open position, to
obtain a circulation of the treatment liquid from the
pump to the tank or the inlet of the pump through
each spraying section, without spraying through the
spraying nozzle(s) of the spraying sections.
According to variant embodiments that can be taken
together or separately:
the spraying system also includes a pressure sensor
designed to measure a pressure in the circuit, down-
stream from the pump and upstream from the pressure
regulator and each spraying section;
the control unit is designed to implement the sub-step to
switch the first distributor of each spraying section and
the second distributor into the open position during the
priming step, when the pressure measured by the pres-
sure sensor is substantially equal to the first threshold
pressure value;
the control unit is designed to implement a sub-step to
inform the user through a user interface during the
priming step and after the sub-step to switch the first
distributor of each spraying section and the second
distributor into the open position, a predetermined
priming time having elapsed after a predefined initial
instant;
the control unit is designed to implement a sub-step to
switch the first distributor of each spraying section and
the second distributor into the closed position, during
the priming step and after the sub-step to switch the first
distributor of each spraying section and the second
distributor into the open position;
the control unit is designed to implement a spraying step
comprising the following sub-steps, after the priming
step:
assign a second threshold pressure value to the thresh-
old pressure of the pressure regulator, the second
threshold pressure value being greater than or equal
to the predefined calibration pressure of the pressure
limiters,
switch the first distributor of at least one spraying
section into the open position, so that treatment
liquid is sprayed through the spraying nozzle(s),
when the pressure in the at least one spraying section
reaches the second threshold pressure value;
the control unit is also designed to implement the follow-
ing sub-steps, during the spraying step:
select at least one spraying section to be supplied with
treatment liquid for spraying onto the plants to be
treated in the field, from among the spraying sec-
tions, prior to the sub-step to assign a second thresh-
old pressure value to the threshold pressure of the
pressure regulator,
assign the second threshold pressure value to the
threshold pressure of the pressure regulator,
switch the first distributor of the at least one selected
spraying section into the open position;
each spraying section comprises a non-return valve
located downstream from the first distributor and in
parallel with the spraying device(s) of said spraying
section.
The invention also relates to a spraying method imple-
mented by means of a spraying system as described above,
the method comprising a priming step itself comprising
sub-steps to:
assign a first threshold pressure value to the threshold
pressure of the pressure regulator, the first threshold
pressure value being less than the predefined calibra-
tion pressure of the pressure limiters,
switch the first distributor of each spraying section and the
second distributor into the open position, to obtain a
circulation of the treatment liquid from the pump to the
tank or the inlet of the pump through each spraying
section, without spraying through the spraying nozzle
(s) of the spraying sections.
According to variant embodiments that can be taken
together or separately:
during the priming step, the sub-step to switch the first
distributor of each spraying section and the second
distributor into the open position is implemented when
a pressure measured in the circuit downstream from the
pump and upstream from the pressure regulator and
each spraying section, is substantially equal to the first
value of the threshold pressure;
the spraying method comprises a sub-step to inform the
user during the priming step and after the sub-step to
switch the first distributor of each spraying section and
the second distributor into the open position, a prede-
termined priming time having elapsed after a pre-
defined initial instant;
the spraying method comprises a sub-step to switch the
first distributor of each spraying section and the second
distributor into the closed position, during the priming
step and after the sub-step to switch the first distributor
of each spraying section and the second distributor into
the open position;
the spraying method also comprises a spraying step
comprising the following sub-steps, after the priming
step:
assign a second threshold pressure value to the thresh-
old pressure of the pressure regulator, the second
threshold pressure value being greater than or equal
to the predefined calibration pressure of the pressure
limiters,
switch the first distributor of at least one spraying
section into the open position, so that treatment
liquid is sprayed through the spraying nozzle(s),
when the pressure in the at least one spraying section
reaches the second threshold pressure value;

the spraying method comprises the following sub-steps, during the priming step:
  select at least one spraying section to be supplied with treatment liquid for spraying onto the plants to be treated in the field, from among the spraying sections, prior to the sub-step to assign a second threshold pressure value to the threshold pressure of the pressure regulator,
  assign the second threshold pressure value to the threshold pressure of the pressure regulator,
  switch the first distributor of the at least one selected spraying section into the open position.

BRIEF DESCRIPTION OF THE DRAWINGS

Other aspects, purposes, advantages and characteristics of the invention will become clear after reading the following detailed description of preferred embodiments of the invention, given as non-limitative examples, with reference to the appended drawings among which.

DETAILED DESCRIPTION

Figure 1:
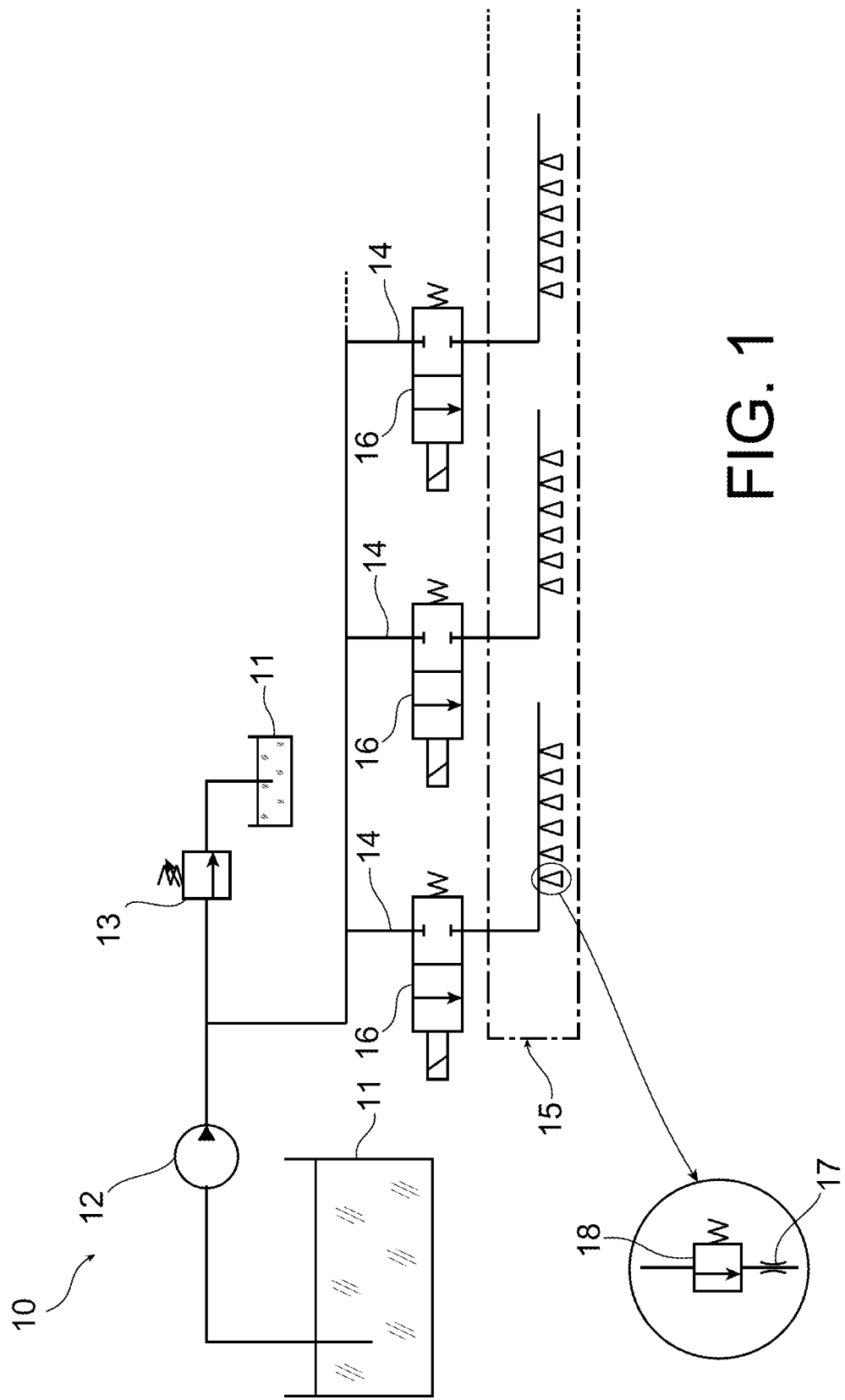
FIG. 1, already described, is a diagrammatic view of an agricultural spraying system known in prior art.
Figure 2:
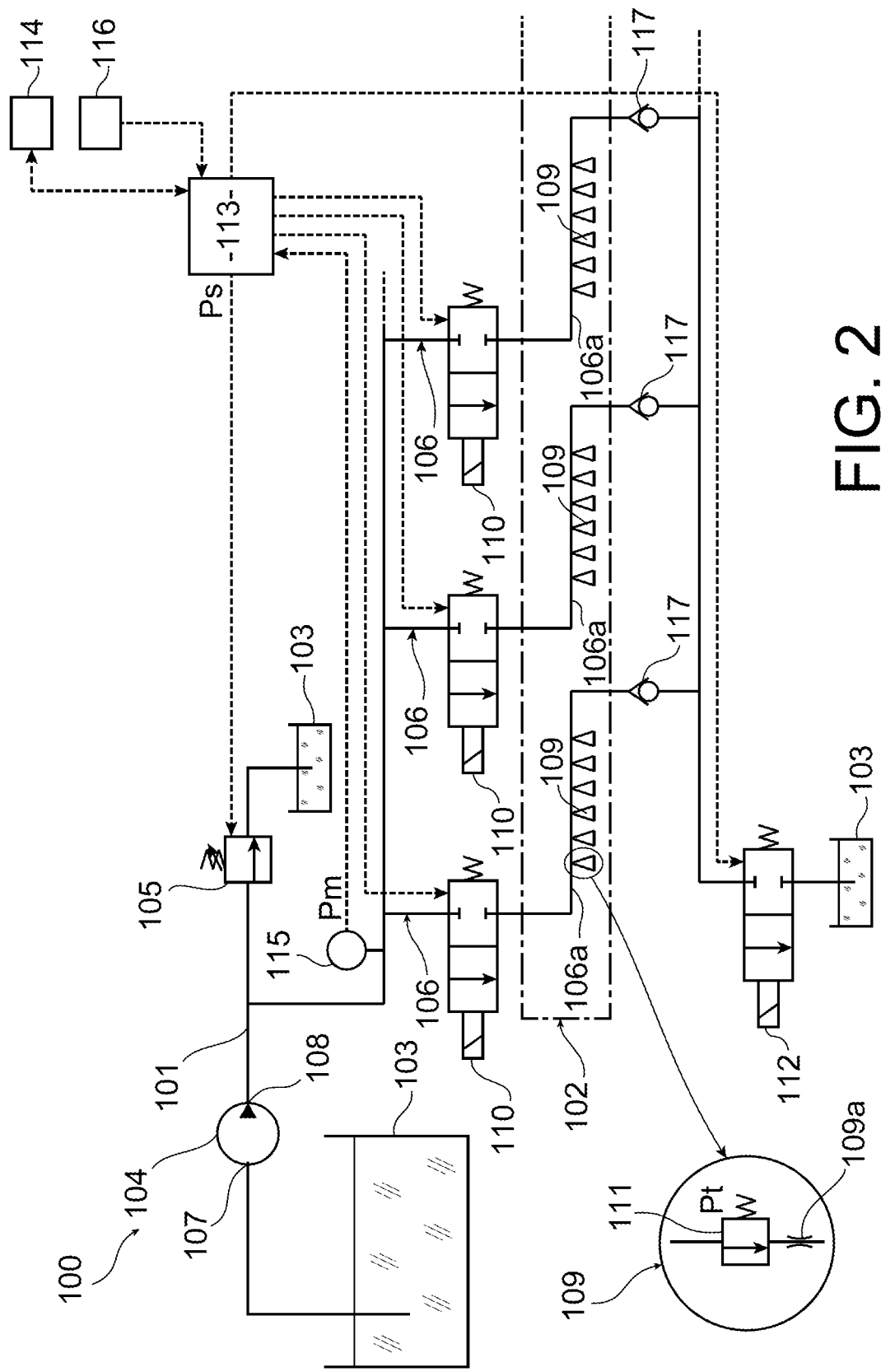
FIG. 2 is a diagrammatic view of a spraying system for an agricultural vehicle according to one embodiment of the invention.
Figure 3:
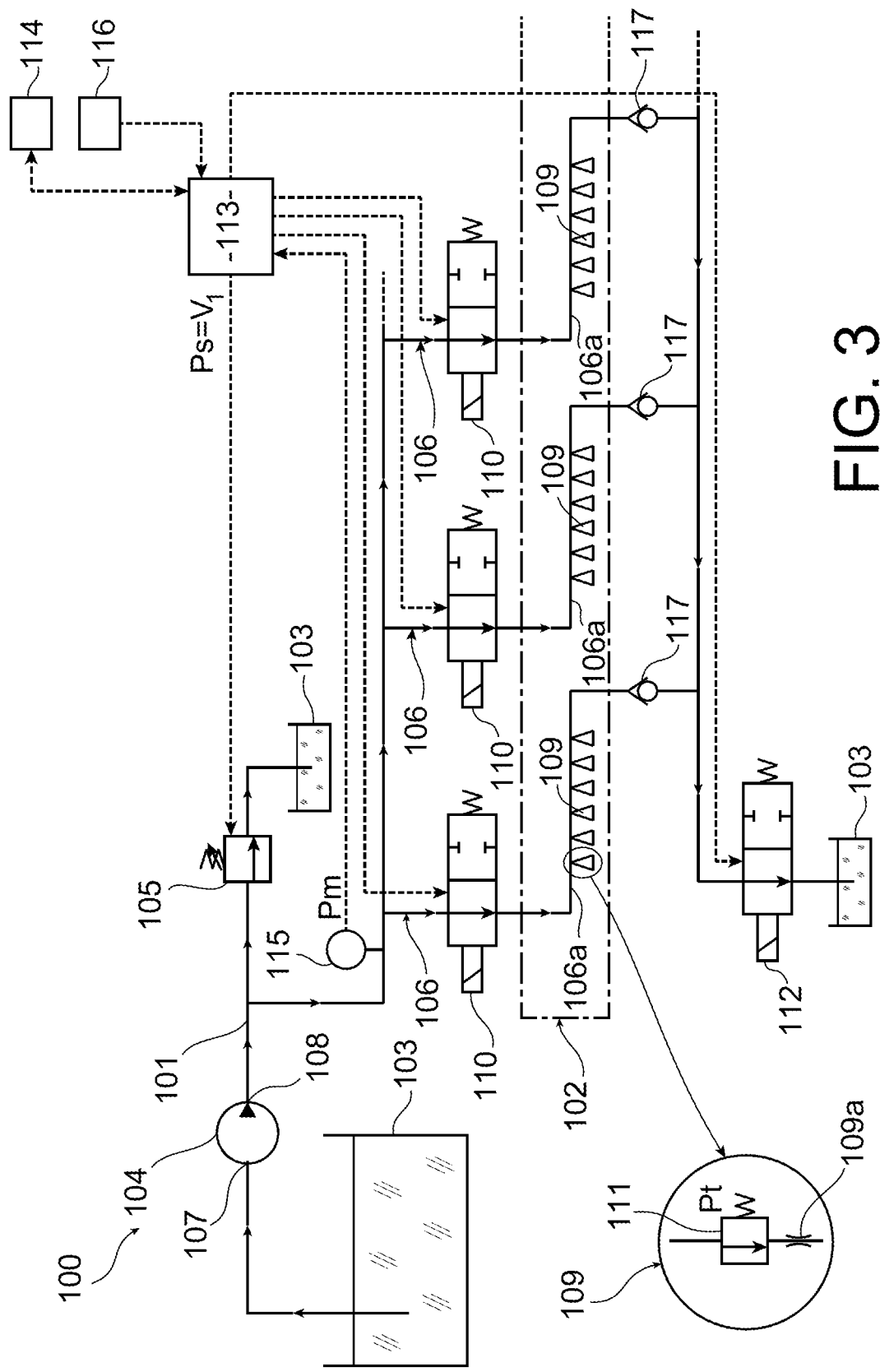
FIG. 3 is a diagrammatic view of the spraying system illustrated in FIG. 2, during a priming step.
Figure 4:
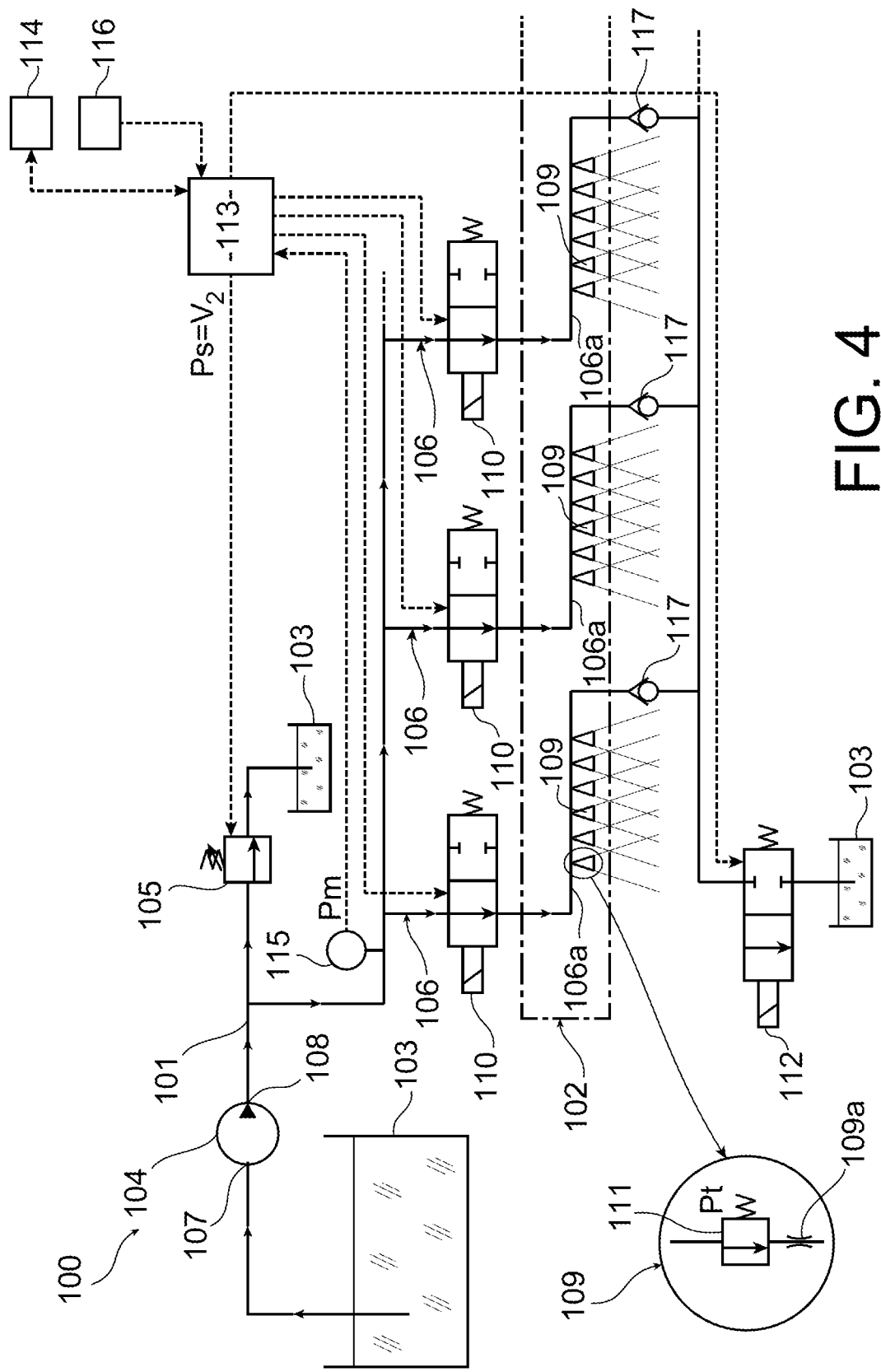
FIG. 4 is a diagrammatic view of the spraying system illustrated in FIG. 2, during a spraying step.

FIGS. 2 to 4 show a spraying system 100 for an agricultural vehicle, designed to spray a treatment liquid in a field of plants to be treated, especially large-scale crops, such as grain cultivation, according to one embodiment of the invention.

The spraying system 100 is in contact with the ground in the field of plants to be treated, particularly through wheels (not shown) such that it can move.

For example, the spraying system 100 is designed to be trailed by the agricultural vehicle. As a variant (not shown), the spraying system 100 is designed to be carried by the agricultural vehicle. In another variant (not shown), the spraying system 100 is self-propelled and thus forms the agricultural vehicle.

An orthogonal coordinate system is adopted, without limitation, comprising a forwards longitudinal direction along the direction of travel of the agricultural vehicle, a transverse direction towards the left and an upwards vertical direction. The longitudinal and transverse directions are horizontal, substantially parallel to the ground in the field of plants to be treated.

The spraying system 100 comprises a circuit 101, a spraying boom 102 extending along a horizontal principal extension direction, and a control unit 113. The principal extension direction is, for example, substantially transverse.

The circuit 101 comprises a tank 103 designed to contain the treatment liquid, a pump 104, a pilot-operated pressure regulator 105 and a plurality of spraying sections 106 mounted in parallel with each other.

The term "liquid" means that the product contained in the tank 103 contains a liquid phase. For example, it may be in the form of a solution or a suspension. For example, it may be a mixture of clean water and plant care products, called a "spray mixture", or liquid fertilizer.

The pump 104 has an inlet 107 that communicates with the tank 103 and through which the pump 104 draws in the treatment liquid contained in the tank 103. The pump 104 also has an outlet 108 through which the pump 104 discharges the treatment fluid drawn in through the inlet 107 of the pump 104.

Throughout the remaining description, the terms "upstream" and "downstream" take account of the direction of circulation of treatment liquid fluid in the circuit 101 that is imposed by the pump 104.

The pressure regulator 105 communicates with the outlet 108 of the pump 104 on the upstream side, and with the tank 103 or with the inlet 107 of the pump 104 on the downstream side. The pressure regulator 105 is also designed to regulate a pressure in the circuit 101, downstream from the pump 104 and upstream from the pressure regulator 105, to a threshold pressure Ps. The pressure regulator 105 can thus maintain the pressure in the circuit 101 substantially equal to the threshold pressure Ps.

Since the pressure regulator 105 is a pilot-operated pressure regulator, the value of the threshold pressure Ps can be adjusted by the control unit 113.

The spraying sections 106 are mounted on the spraying boom 102. They are also uniformly or non-uniformly distributed, along the spraying boom 102.

Each spraying section 106 comprises at least one spraying device 109, a first distributor 110 and at least one direct acting pressure limiter 111.

The or each spraying device 109 of the spraying section 106 forms a fork with a principal conduit 106a of the spraying section 106. The spraying devices 109 are mounted in parallel with each other.

The or each spraying device 109 also comprises at least one spraying nozzle 109a designed to spray the treatment liquid on plants to be treated in the field, particularly along the direction of the ground S.

The spraying device 109 may also comprise a nozzle support (not shown) on which one or more spraying nozzles 109a are mounted. For example, the nozzle support is designed to selectively connect one of the spraying nozzles 109a to the principal conduit 106a.

The first distributor 110 communicates with the outlet 108 of the pump 104 on the upstream side, in parallel with the pressure regulator 105 and the other spraying section(s) 106, and with the spraying device(s) 109 of the spraying section 106 on the downstream side. The first distributor 110 is designed to allow a circulation of treatment liquid discharged from the outlet 108 of the pump 104 to the spraying device(s) 109 of the spraying section 106 when in an open position, and to block this circulation of treatment liquid when in a closed position.

The first distributor 110 may for example be an on-off distributor. As a variant (not shown), the first distributor 110 is a proportional distributor.

A pressure limiter 111 is also interposed between the first distributor 110 and the spraying nozzle(s) 109a each spraying device 109 of the spraying section 106. The or each pressure limiter 111 is designed to allow a circulation of treatment liquid from the first distributor 110 to the spraying nozzle(s) 109a with which it communicates when a pressure in the spraying section 106 upstream from the pressure limiter 111, is greater than or equal to a predefined calibration pressure Pt. Thus, when the pressure in the spraying section 106, upstream from the pressure limiter(s) 111, is greater than the calibration pressure Pt of the pressure limiter(s) 111, the treatment liquid is supplied to the spraying nozzle(s) 109a that spray it.

For example, the calibration pressure Pt is equal to 0.6 bar.

Since the pressure limiter 111 is a direct acting pressure limiter, the value of the calibration pressure Pt cannot be adjusted by the control unit 113.

For example, the or each pressure limiter 111 of spraying sections 106 may be integrated into the spraying device 109 with the spraying nozzle(s) 109a with which it communicates, particularly into the nozzle support of this spraying device 109.

For example, the or each pressure limiter 111 is provided with a membrane blocking an opening of the pressure limiter 111 and cooperating with a spring, the calibration pressure Pt thus being defined by the stiffness of the elastic membrane and the spring. When the pressure in the spraying section 106a reaches the calibration pressure Pt, the membrane releases the opening of pressure limiter 111, which thus supplies the spraying nozzle(s) 109a with which the pressure limiter 111 communicates.

The circuit 101 also comprises a second distributor 112 communicating with each spraying section 106 on the upstream side, and with the tank 103 or with the inlet 107 of the pump 104 on the downstream side. The second distributor 112 is thus installed downstream from the spraying sections 106, the treatment liquid circulating through the spraying sections 106 before reaching the second distributor 112. In particular, the distributor 112 communicates with the first distributor 110 and the fork(s) formed by the principal conduit 106a and the spraying device(s) 109 of each spraying section 106, on the upstream side. The second distributor 112 is designed to allow a circulation of treatment liquid from the first distributor 110 of each spraying section 106 to the tank 103 or to the inlet 107 of the pump 104 when in an open position, and to block this circulation of treatment liquid when in a closed position.

The second distributor 112 may for example by an on-off distributor. As a variant (not shown), the second distributor 112 is a proportional distributor.

Figure 5:
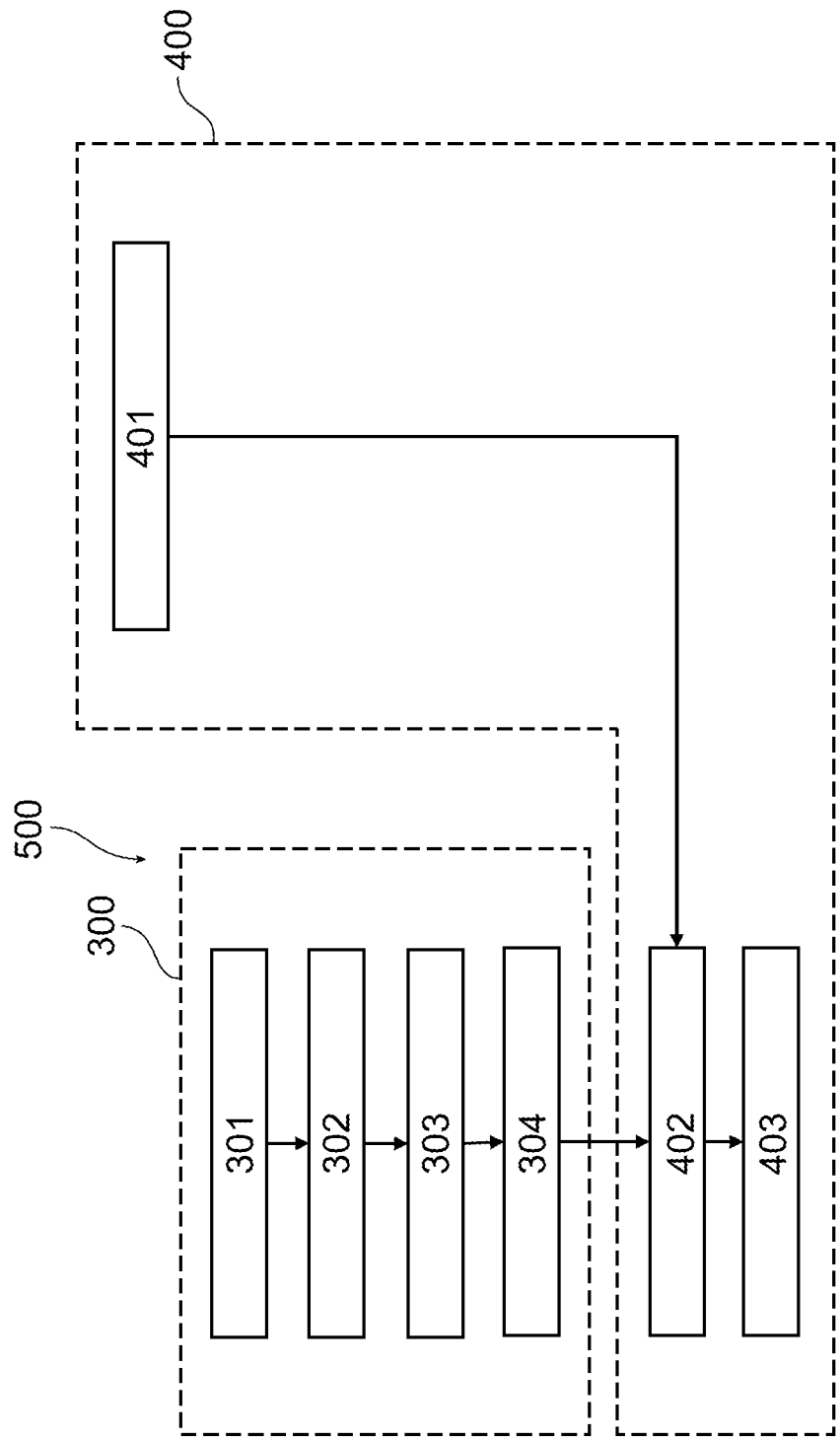
FIG. 5 is a flow chart of a spraying method using the spraying system illustrated in FIGS. 2 to 4.

After the pump 104 has started so as to draw in treatment liquid contained in the tank 103, the control unit 113 is designed to implement a step 300 to prime the spraying system 100 (FIG. 5). This priming step 300 comprises the following sub-steps:
 assign 301 a first threshold pressure value V1 to the threshold pressure Ps of the pressure regulator 105, the first threshold pressure value V1 being less than the calibration pressure Pt of the pressure limiters 111 (FIGS. 3 and 5),
 switch 302 the first distributor 110 of each spraying section 106 and the second distributor 112 into the open position, so as to obtain a circulation of treatment liquid from the pump 104 to the tank 103 or to the inlet 107 of the pump 104 through each spraying section 106, without spraying fluid through the spraying nozzle(s) 109 of the spraying sections 106 (FIGS. 3 and 5).

In this way, when the first distributors 110 and the second distributor 112 switch to the open position, the treatment liquid drawn in by the pump 104 supplies the spraying sections 106, then filled with air or clean water after having been rinsed, forcing this air or clean water through the second distributor 112 to the tank 103, and thus priming the spraying sections 106 (FIG. 3).

Furthermore, since the first threshold pressure value V1 assigned to the threshold pressure Ps of the pressure regulator 105 is less than the calibration pressure Pt of the pressure limiters 111, the pressure in the circuit 101 is necessarily less than the calibration pressure Pt of the pressure limiters 111 that blocks the circulation of fluid—air/clean water and treatment liquid—to the spraying nozzles 109a (FIG. 3). Therefore the spraying sections 106 are primed without the risk of fluid spraying through the spraying nozzles 109a.

Thus, the agricultural vehicle can remain stationary at the edge of the field while the spraying sections 106 are being primed, without causing a risk of excess concentration of treatment liquid at the edge of the field due to spraying of fluid—air/clean water and treatment liquid—through the spraying nozzles 109a. This is better for the crops and the environment.

To achieve this, the control unit 113 comprises, for example, an input interface, an output interface, a program memory in which the priming step 300 is stored, a data memory in which the threshold pressure Ps and the calibration pressure Pt are pre-recorded, and a microprocessor. At least one communication bus also links the input and output interfaces, the program memory, the data memory and the microprocessor.

For example, the input interface may be linked to a user interface 114. To achieve this, the user interface 114 may for example be arranged in a driving cab of the agricultural vehicle. The user interface 114 may consist of a touch screen.

For example, the output interface is connected to the pressure regulator 105, to the first distributors 110, to the second distributor 112, and possibly to the user interface 114.

For example, the first threshold pressure value V1 is stored by the user in the data memory of the control unit 113 using the user interface 114. As a variant, the first threshold pressure value V1 is pre-recorded in the data memory of the control unit 113.

For example, the first value of the threshold pressure V1 is equal to 0.4 bar.

The pump 104 can be started manually or pilot-operated by the control unit 113.

During the sub-step to switch 302 the first distributors 110 and the second distributor 112 into the open position, the first distributors 110 and the second distributor 112 are, for example, switched into the open position successively. For example, the second distributor 112 is switched into the open position before the first distributors 110. The inverse is also possible, the first distributors 110 being switched into the open position before the second distributor 112. As a variant, the first distributors 110 and the second distributor 112 are, for example, switched into the open position simultaneously.

The spraying system 100 also includes, for example, a pressure sensor 115 designed to measure a pressure Pm in the circuit 101, downstream from the pump 104 and upstream from the pressure regulator 105 and each spraying section 106.

The control unit 113 is designed to control opening and closing of the pressure regulator 105 as a function of the pressure Pm measured by the pressure sensor 115, so as to maintain the pressure of the circuit 101, downstream from the pump 104 and upstream from the pressure regulator 105, substantially equal to the threshold pressure Ps. In other words, when the pressure Pm measured by the pressure sensor 115 is less than the threshold pressure Ps, the control unit 113 controls the pressure regulator 105 to make it close more, so as to increase the pressure in the circuit 101 until the threshold pressure Ps is reached. On the contrary, when the pressure Pm measured by the pressure sensor 115 is greater than the threshold pressure Ps, the control unit 113 controls the pressure regulator 105 to make it to open more, so as to reduce the pressure in the circuit 101 until the threshold pressure Ps is reached. Thus, the pressure in the circuit 101 can be regulated, and therefore the pressure can be kept substantially equal to the threshold pressure Ps. It will be understood that once the pressure in the circuit 101 has reached the threshold pressure Ps, the pressure in the circuit 101 oscillates around the threshold pressure Ps, the difference between the threshold pressure Ps and these oscillations being however negligible compared with the threshold pressure Ps.

For example, the control unit 113 is designed to implement the sub-step to switch 302 the first distributor 110 of each spraying section 106 and the second distributor 112 into the open position during the priming step 300, when the pressure Pm measured by the pressure sensor 115 is substantially equal to the first threshold pressure value V1. In other words, the switching sub-step 302 is only carried out when the pressure in the circuit 101, downstream from the pump 104 and upstream from the pressure regulator 105 and each spraying section 106, has reached the threshold pressure Ps, then equal to the first threshold pressure value V1. "Substantially equal" means that the pressure Pm measured by the pressure sensor 115 is equal to the first threshold pressure value V1 with an error of less than 1%.

In this way, when the first and second distributors 110, 112 switch to the open position, there is no risk of a sudden pressure rise in spraying sections 106 such that the pressure would exceed the calibration pressure Pt of the pressure limiters 111 before returning to the threshold pressure Ps, which would cause losses of fluid—air/clean water and treatment liquid—escaping from the spraying nozzles 109a.

For example, the pressure sensor 115 is connected to the input interface of the control unit 113, so as to communicate the pressure Pm measured in the circuit 101. The pressure Pm measured in the circuit 101 by the pressure sensor 115 can also be stored in the data memory of the control unit 113.

The control unit 113 is for example designed to implement a sub-step to inform 303 the user through the user interface 114 during the priming step 300 and after the sub-step to switch 302 the first distributor 110 of each spraying section 106 and the second distributor 112 into the open position, a predetermined priming time having elapsed after a predefined initial instant.

In this way, the control unit 113 performs a time-out and informs the user when priming of spraying sections 106 is deemed to be complete. The user then knows that he can start the treatment of plants in the field.

To achieve this, the spraying system 100 includes, for example, a time counter 116 such as a clock. For example, the time counter 116 is connected to the input interface of the control unit 113.

For example, the information sub-step 303 is performed by issuing an audible or visual signal by means of the user interface 114.

For example, the priming duration is stored by the user in the data memory of the control unit 113 using the user interface 114. As a variant, the priming duration is pre-recorded in the data memory of the control unit 113.

For example, the initial instant is defined by starting of the pump 104, when it is pilot-operated by the control unit 113. As a variant, the initial instant is defined by implementation of the sub-step to assign 301 the first threshold pressure value V1 to the threshold pressure Ps, or by implementation of the sub-step to switch 302 the first distributor 110 of each spraying section 106 and the second distributor 112 into the open position. The time count is thus initiated when the pump 104 has started or when the first threshold pressure value V1 has been assigned to the threshold pressure Ps or when the first distributors 110 and the second distributor 112 have been switched into the open position.

For example, the initial instant is stored by the user in the data memory of the control unit 113 using the user interface 114. As a variant, the initial instant is pre-recorded in the data memory of the control unit 113.

The control unit 113 may also be designed to implement a sub-step to switch 304 the first distributor 110 of each spraying section 106 and the second distributor 112 into the closed position, during the priming step 300 and after the sub-step to switch 302 the first distributor 110 of each spraying section 106 and the second distributor 112 into the open position.

During the sub-step to switch 304 the first distributors 110 and the second distributor 112 into the closed position, the first distributors 110 are switched into the closed position before the second distributor 112. As a variant, the first distributors 110 and the second distributor 112 are switched into the closed position simultaneously. In both cases, this prevents a pressure spike in the spraying sections 106, this pressure spike possibly exceeding the calibration pressure Pt of the pressure limiters 111 and thus causing leaks of the treatment liquid through the spraying nozzles 109a.

For example, the sub-step to switch 304 the first distributors 110 and the second distributor 112 into the closed position is performed automatically by the control unit 113 when the priming time has elapsed.

As a variant, the sub-step to switch 304 the first distributors 110 and the second distributor 112 into the closed position is performed by the control unit 113 after receiving a command sent by the user through the user interface 114. This command is advantageously sent by the user, after having been informed during the information sub-step 303, that priming of spraying sections 106 is deemed to be complete.

The control unit 113 can also be designed to implement a spraying step 400 (FIG. 5). This spraying step 400 includes the following sub-steps, after the priming step 300:

assign 402 a second threshold pressure value V2 to the threshold pressure Ps of the pressure regulator 105, the second threshold pressure value V2 being greater than or equal to the calibration pressure Pt of the pressure limiters 111 (FIGS. 4 and 5), switch 403 the first distributor 110 of at least one spraying section 106 into the open position, so that treatment liquid is sprayed through the spraying nozzle(s) 109, when the pressure in the at least one spraying section 106 reaches the second threshold pressure value V2 (FIGS. 4 and 5).

In this manner, since the second threshold pressure value V2 assigned to the threshold pressure Ps of the pressure regulator 105 is greater than or equal to the calibration pressure Pt of the pressure limiters 111, the pressure in the spraying sections 106 is necessarily greater than or equal to the calibration pressure Pt of the pressure limiters 111 that thus enables a circulation of the treatment liquid to the spraying nozzles 109a and therefore spraying on the plants to be treated in the field (FIG. 4).

For example, the spraying step 400 is recorded in the program memory of the control unit 113.

For example, the second threshold pressure value V2 is stored by the user in the data memory of the control unit 113 using the user interface 114. As a variant, the second threshold pressure value V2 is pre-recorded in the data memory of the control unit 113. As another variant, the second threshold pressure value V2 is calculated from a speed of the spraying system 100, especially of the agricultural vehicle, the pressure Pm measured by the pressure sensor 115, a flow rate through the spraying nozzles 109a as a function of the pressure, as well as a volume of treatment liquid to be sprayed per hectare. For example, the speed is measured using a speed sensor equipped with the agricultural spraying system 100 or the agricultural vehicle. For example, the flow through the spraying nozzles 109A as a function of the pressure is pre-recorded in the data memory of the control unit 113. For example, the volume of the treatment liquid to be sprayed per hectare is stored by the user in the data memory of the control unit 113 using the user interface 114.

For example, the control unit 113 is designed to implement the sub-step to switch 403 the first distributor 110 of at least one spraying section 106a into the open position, when the pressure Pm measured by the pressure sensor 115 is substantially equal to the second threshold pressure value V2. In other words, the switching sub-step 403 is only carried out when the pressure in the circuit 101, downstream from the pump 104 and upstream from the pressure regulator 105 and each spraying section 106, has reached the threshold pressure Ps, then equal to the second threshold pressure value V2. "Substantially equal" means that the pressure Pm measured by the pressure sensor 115 is equal to the second threshold pressure value V2 with an error of less than 1%.

For example, during the spraying step 400, the control unit 113 is also designed to implement the following sub-steps:
  select 401 at least one spraying section 106 to be supplied with treatment liquid for spraying onto plants to be treated in the field, from among the spraying sections 106,
  assign 402 the second threshold pressure value V2 to the threshold pressure Ps of the pressure regulator 105,
  switch 403 the first distributor 110 of the at least one selected spraying section 106 into the open position.

The sub-step to select 401 the spraying section(s) 106 to be supplied with treatment liquid can be performed before, during or after the priming step 300.

For example, the sub-step to select 401 the spraying section(s) 106 to be supplied with treatment liquid is done manually by the user, particularly through the user interface 114.

As a variant, the sub-step to select 401 the spraying section(s) 106 to be supplied with treatment liquid is done automatically by the control unit 113, from a map of the plants to be treated that can be pre-established and from a geographical position sensor of the spraying system 100. The map of the plants to be treated may for example be stored by the user in the data memory using the user interface 114.

Each spraying section 106 may also comprise a non-return valve 117 located downstream from the first distributor 110 and in parallel with the spraying device(s) 109 of said spraying section 106a. The non-return valve 117 of each spraying section 106 can also be arranged downstream from the fork(s) formed by the principal conduit 106a and by the spraying device(s) 109 in said spraying section 106. During the spraying step 400, this prevents the treatment liquid circulating in spraying sections 106, the first distributor 110 of which is in the open position, from supplying spraying sections 106, the first distributor of which is in the closed position, in the reverse direction, with the risk that these latter spraying sections 106 could spray treatment liquid and therefore lead to an overdose of the treatment fluid administered to the plants to be treated.

As a variant (not shown), the pressure limiters 111 are replaced by pneumatically controlled valves. Each of said valves is designed to close when an air or gas pressure is applied to the valve, and to open and thus allow the circulation of treatment liquid to the treatment nozzle(s) 109a when this air or gas pressure is released. To achieve this, a pneumatic circuit is provided comprising one or more solenoid valves controlled by the control unit 113 to apply/release the air or gas pressure applied to the valves. The value of the air or gas pressure to be applied to the valves to close them cannot be adjusted by the control unit 113. It is greater than the first and second threshold pressure values V1, V2. Of course, in this case, the threshold pressure value Ps of the pressure regulator 105 is not fixed as a function of a calibration pressure Pt of the pressure limiters 111. During the priming step 300, the air or gas pressure is applied to the valves, so as to keep them closed. The first and second threshold pressure values V1, V2 may be different, the first threshold pressure value V1 not necessarily being lower than the second threshold pressure value V2. The first and second threshold pressure values V1, V2 can also be equal and be assigned to the threshold pressure Ps of the pressure regulator 105 only once during the priming step 300.

As a variant (not shown), the pressure limiters 111 are replaced by pneumatically controlled valves. Each of said valves is designed to close when an air or gas pressure is applied to the valve, and to open and thus allow the circulation of treatment liquid to the treatment nozzle(s) 109a when this air or gas pressure is released. To achieve this, a pneumatic circuit is provided comprising one or more solenoid valves controlled by the control unit 113 to apply/release the air or gas pressure applied to the valves. The value of the air or gas pressure to be applied to the valves to close them can be adjusted by the control unit 113. It is greater than the first and second threshold pressure values V1, V2. Of course, in this case, the threshold pressure value Ps of the pressure regulator 105 is not fixed as a function of a calibration pressure Pt of the pressure limiters 111. During the priming step 300, the air or gas pressure is applied to the valves, so as to keep them closed. Furthermore, since the value of the air or gas pressure to be applied to the valves to close them is adjustable, it is possible to increase the value of the air or gas pressure to be applied to the valves to close them during the priming step 300, so that the first threshold pressure value V1 itself can be increased, thus allowing for faster priming of spraying sections 106. The first and second threshold pressure values V1, V2 may be different, the first threshold pressure value V1 not necessarily being lower than the second threshold pressure value V2. The first and second threshold pressure values V1, V2 can also be equal and be assigned to the threshold pressure Ps of the pressure regulator 105 only once during the priming step 300.

Also as a variant (not shown), the pressure limiters 111 are replaced by valves controlled by the control unit 113 by pulse width modulation ("PWM"). To achieve this, each valve is equipped with a solenoid controlled by pulse width modulation so as to cyclically open and close the valve and to control the valve opening time per cycle. Of course, in this case, the threshold pressure value Ps of the pressure regulator 105 is not fixed as a function of a calibration pressure Pt of the pressure limiters 111. During the priming step 300, the valves are held closed by the control unit 113. The first and second threshold pressure values V1, V2 may be different, the first threshold pressure value V1 not necessarily being lower than the second threshold pressure value V2. The first and second threshold pressure values V1, V2 can also be equal and be assigned to the threshold pressure Ps of the pressure regulator 105 only once during the priming step 300.

FIG. 5 shows a method 500 for spraying a treatment liquid onto plants to be treated using the spraying system 100.

For example, the spraying method 500 is recorded in the program memory of the control unit 113 of the spraying system 100.

The spraying method 500 includes a priming step 300, after starting the pump 104 to draw in treatment liquid contained in the tank 103, itself comprising the following sub-steps:

assign 301 a first threshold pressure value V1 to the threshold pressure Ps of the pressure regulator 105, the first threshold pressure value V1 being less than the calibration pressure Pt of the pressure limiters 111, switch 302 the first distributor 110 of each spraying section 106 and the second distributor 112 into the open position, to obtain a circulation of treatment liquid from the pump 104 to the tank 103 or to the inlet 107 of the pump 104 through each spraying section 106, without spraying treatment liquid through the spraying nozzle(s) 109 of the spraying sections 106.

During the sub-step to switch 302 the first distributors 110 and the second distributor 112 into the open position, the first distributors 110 and the second distributor 112 are, for example, switched into the open position in succession. For example, the second distributor 112 is switched into the open position before the first distributors 110. The inverse is also possible, the first distributors 110 being switched into the open position before the second distributor 112. As a variant, the first distributors 110 and the second distributor 112 are switched into the open position simultaneously.

During the priming step 300, the sub-step to switch 302 the first distributor 110 of each spraying section 106 and the second distributor 112 into the open position is implemented, for example, when a pressure Pm measured in the circuit 101 downstream from the pump 104 and upstream from the pressure regulator 105 and each spraying section 106, is substantially equal to the first value of the threshold pressure V1.

The spraying method 500 may also comprise a sub-step to inform 303 the user, particularly by issuing a sound or visual signal, during the priming step 300 and after the sub-step to switch 302 the first distributor 110 of each spraying section 106 and the second distributor 112 into the open position, a predetermined priming time having elapsed after a predefined initial instant.

The spraying method 500 also comprises, for example, a sub-step to switch 304 the first distributor 110 of each spraying section 106 and the second distributor 112 into the closed position, during the priming step 300 and after the sub-step 302 to switch the first distributor 110 of each spraying section 106 and the second distributor 112 into the open position.

During the sub-step to switch 304 the first distributors 110 and the second distributor 112 into the closed position, the first distributors 110 are switched into the closed position before the second distributor 112. As a variant, the first distributors 110 and the second distributor 112 are switched into the closed position simultaneously. In both cases, this prevents a pressure spike in the spraying sections 106, this pressure spike possibly exceeding the calibration pressure Pt of the pressure limiters 111 and thus causing leaks of the treatment liquid through the spraying nozzles 109a.

The sub-step 304 to switch 304 the first distributors 110 and the second distributor 112 into the closed position can be implemented automatically, when the priming time has elapsed, or after a command has been sent by the user for this purpose. This command is advantageously sent by the user, after being informed during the information sub-step 303, that priming of spraying sections 106 is deemed to be complete.

The spraying method 500 may also comprise a spraying step 400 comprising the following sub-steps, after the priming step 300:

assign 402 a second threshold pressure value V2 to the threshold pressure Ps of the pressure regulator 105, the second threshold pressure value V2 being greater than or equal to the predefined calibration pressure Pt of the pressure limiters 111, switch 403 the first distributor 110 of at least one spraying section 106 into the open position, so that treatment liquid is sprayed through the spraying nozzle(s) 109, when the pressure in the at least one spraying section 106 reaches the second threshold pressure value V2.

For example, during the spraying step 400, the spraying method 500 includes the following sub-steps:

select 401 at least one spraying section 106 to be supplied with treatment liquid for spraying onto plants to be treated in the field, from among the spraying sections 106, assign 402 the second threshold pressure value V2 to the threshold pressure Ps of the pressure regulator 105, switch 403 the first distributor 110 of the at least one selected spraying section 106 into the open position.

The sub-step to select 401 the spraying section(s) 106 to be supplied with treatment liquid can be performed before, during or after the priming step 300.

For example, the sub-step to select 401 the spraying section(s) 106 to be supplied with treatment liquid is done manually by the user. As a variant, the sub-step to select 401 the spraying section(s) 106 to be supplied with treatment liquid is done automatically, from a pre-established map of the plants to be treated and the geographic position of the spraying system 100.

For example, the sub-step to switch 405 the first distributor 110 of the at least one spraying section 106a into the open position is done when the pressure Pm measured by the pressure sensor 115 is substantially equal to the second threshold pressure value V2.

The spraying system 100 and the spraying method 500 described above are particularly advantageous because they make it possible to prime spraying sections 106 without spraying any fluid—air/clean water and treatment liquid—and therefore with no losses and no overdose of the treatment liquid in the field.

The invention claimed is:

1. Spraying system for an agricultural vehicle comprising a spraying boom extending along a principal extension direction, and a circuit comprising:
a tank for containing a treatment liquid;
a pump comprising an inlet and an outlet, the pump being designed to draw in the treatment liquid contained in the tank through the inlet and to discharge the drawn in treatment liquid through the outlet;
a pilot-operated pressure regulator communicating with the outlet of the pump on an upstream side of the pressure regulator, and with the tank or the inlet of the pump on a downstream side of the pressure regulator, the pressure regulator being designed to regulate a pressure in the circuit downstream from the pump and upstream from the pressure regulator to a threshold pressure;

a plurality of spraying sections mounted on the spraying boom, each spraying section comprising:
  at least one spraying device comprising at least one spraying nozzle designed to spray treatment liquid on plants to be treated in the field,
  a first distributor communicating with the outlet of the pump on an upstream side of the first distributor, and with the at least one spraying device of the spraying section on a downstream side of the first distributor, the first distributor being designed to allow a circulation of treatment liquid discharged through the outlet of the pump to the at least one spraying device of the spraying section when in an open position, and to block said circulation of treatment liquid when in a closed position,
  a direct acting pressure limiter interposed between the first distributor and the at least one spraying nozzle of each spraying device of the spraying section, the or each pressure limiter being designed to allow a circulation of treatment liquid from the first distributor to the at least one spraying nozzle with which it communicates when a pressure in the spraying section upstream from the pressure limiter, is greater than or equal to a predefined calibration pressure;

a control unit;

a second distributor communicating with each said spraying section on an upstream side of the second distributor, and with the tank or the inlet of the pump on a downstream side of the second distributor, the second distributor being designed to allow a circulation of treatment liquid from each said spraying section to the tank or the inlet of the pump when in an open position, and to block said circulation of treatment liquid when in a closed position; and the control unit is designed to implement a priming step of the spraying system comprising sub-steps to:
  assign a first threshold pressure value to the threshold pressure of the pressure regulator, the first threshold pressure value being less than the predefined calibration pressure of the pressure limiters,
  switch the first distributor of each said spraying section and the second distributor into the open position, to obtain a circulation of treatment liquid from the pump to the tank or the inlet of the pump through each said spraying section, without spraying through the at least one spraying nozzle of the spraying sections.

2. The spraying system according to claim 1, also including a pressure sensor designed to measure a pressure in the circuit, downstream from the pump and upstream from the pressure regulator and each said spraying section, and wherein the control unit is designed to implement the sub-step to switch the first distributor of each said spraying section and the second distributor into the open position during the priming step, when the pressure measured by the pressure sensor is substantially equal to the first threshold pressure value.

3. The spraying system according to claim 1, wherein the control unit is designed to implement a sub-step to inform the user by means of a user interface during the priming step and after the sub-step to switch the first distributor of each said spraying section and the second distributor into the open position, a predetermined priming time having elapsed after a predefined initial instant.

4. The spraying system according to claim 1, wherein the control unit is designed to implement a sub-step to switch the first distributor of each said spraying section and the second distributor into the closed position, during the priming step and after the sub-step to switch the first distributor of each said spraying section and the second distributor into the open position.

5. The spraying system according to claim 4, wherein the control unit is also designed to implement a spraying step comprising the following sub-steps, after the priming step:
  assign a second threshold pressure value to the threshold pressure of the pressure regulator, the second threshold pressure value being greater than or equal to the predefined calibration pressure of the pressure limiters,
  switch the first distributor of at least one spraying section into the open position, so that treatment liquid is sprayed through the at least one spraying nozzle, when the pressure in the at least one spraying section reaches the second threshold pressure value.

6. The spraying system according to claim 1, wherein each said spraying section has a non-return valve located downstream from the first distributor and in parallel with the at least one spraying device of said spraying section.

7. Spraying method making use of a spraying system according to claim 1, the method comprising a priming step itself comprising the following sub-steps:
  assign the first threshold pressure value to the threshold pressure of the pressure regulator, the first threshold pressure value being less than the predefined calibration pressure of the pressure limiters,
  switch the first distributor of each said spraying section and the second distributor into the open position, to obtain a circulation of treatment liquid from the pump to the tank or the inlet of the pump through each said spraying section, without spraying through the at least one spraying nozzle of the spraying sections.

8. The spraying method according to claim 7 wherein, during the priming step, the sub-step to switch the first distributor of each said spraying section and the second distributor into the open position is implemented when a pressure measured in the circuit downstream from the pump and upstream from the pressure regulator and each said spraying section, is substantially equal to the first value of the threshold pressure.

9. The spraying method according to claim 7, comprising a sub-step to inform the user during the priming step and after the sub-step to switch the first distributor of each said spraying section and the second distributor into the open position, a predetermined priming time having elapsed after a predefined initial instant.

10. The spraying method according to claim 7, comprising a sub-step to switch the first distributor of each said spraying section and the second distributor into the closed position, during the priming step and after the sub-step to switch the first distributor of each said spraying section and the second distributor into the open position.

11. The spraying method according to claim 10, also comprising a spraying step comprising the following sub-steps, after the priming step:
  assign a second threshold pressure value to the threshold pressure of the pressure regulator, the second threshold pressure value being greater than or equal to the predefined calibration pressure of the pressure limiters,
  switch the first distributor of at least one of the spraying sections into the open position, so that treatment liquid is sprayed through the at least one spraying nozzle, when the pressure in the at least one of the spraying sections reaches the second threshold pressure value.

* * * * *